US009532070B2

(12) United States Patent
Laroche et al.

(10) Patent No.: US 9,532,070 B2
(45) Date of Patent: Dec. 27, 2016

(54) METHOD AND DEVICE FOR PROCESSING A VIDEO SEQUENCE

(75) Inventors: Guillaume Laroche, Rennes (FR); Patrice Onno, Rennes (FR)

(73) Assignee: CANON KABUSHIKI KAISHA, Tokyo (JP)

(*) Notice: Subject to any disclaimer, the term of this patent is extended or adjusted under 35 U.S.C. 154(b) by 881 days.

(21) Appl. No.: 13/500,609

(22) PCT Filed: Oct. 13, 2010

(86) PCT No.: PCT/IB2010/054638
§ 371 (c)(1),
(2), (4) Date: Apr. 5, 2012

(87) PCT Pub. No.: WO2011/045758
PCT Pub. Date: Apr. 21, 2011

(65) Prior Publication Data
US 2012/0207210 A1    Aug. 16, 2012

(30) Foreign Application Priority Data

Oct. 13, 2009 (FR) ...................... 09 57159

(51) Int. Cl.
*H04N 7/32* (2006.01)
*H04N 7/26* (2006.01)
(Continued)

(52) U.S. Cl.
CPC .......... *H04N 19/573* (2014.11); *H04N 19/105* (2014.11); *H04N 19/126* (2014.11);
(Continued)

(58) Field of Classification Search
CPC .. H04N 19/105; H04N 19/126; H04N 19/172; H04N 19/176; H04N 19/18; H04N 19/46; H04N 19/573; H04N 19/61
See application file for complete search history.

(56) References Cited

U.S. PATENT DOCUMENTS 6,332,001 B1 * 12/2001 Arayashiki et al. .......... 375/240
6,501,860 B1   12/2002 Charrier et al. .............. 382/240
(Continued)

FOREIGN PATENT DOCUMENTS

EP    1 578 131    3/2004
EP    1 615 441    7/2004

OTHER PUBLICATIONS

Overview of the H.264/AVC Video Coding Standard ThomasWiegand, Gary J. Sullivan, Senior Member, IEEE, Gisle Bjøntegaard, and Ajay Luthra, Senior Member, IEEE.*
(Continued)

*Primary Examiner* — M D Haque
(74) *Attorney, Agent, or Firm* — Fitzpatrick, Cella, Harper & Scinto

(57) ABSTRACT

The present invention concerns a method and device (10, 20) for the processing, in particular coding or decoding or more generally compression or decompression, of a video sequence (110) consisting of a series of digital images (401 to 407) comprising a current image (401) to process. The method comprises the steps consisting of: —generating (511, 603, 720, 812) a first reconstruction of a first image (402 to 404) in the sequence, so as to obtain a first reference image (517, 610, 717, 810); —generating (519, 612, 720, 812) a second reconstruction of the first image (402 to 404) different from the first reconstruction, so as to obtain a second reference image (518, 611, 718, 811); and—predicting (505, 606, 705, 806) at least part of said current image (401) from at least one reference image selected from the generated first and second reference images (516, 608, 716, 808).

16 Claims, 9 Drawing Sheets

(51) Int. Cl.
*H04N 19/573* (2014.01)
*H04N 19/105* (2014.01)
*H04N 19/176* (2014.01)
*H04N 19/172* (2014.01)
*H04N 19/46* (2014.01)
*H04N 19/61* (2014.01)
*H04N 19/126* (2014.01)
*H04N 19/18* (2014.01)

(52) U.S. Cl.
CPC ......... *H04N 19/172* (2014.11); *H04N 19/176* (2014.11); *H04N 19/18* (2014.11); *H04N 19/46* (2014.11); *H04N 19/61* (2014.11)

(56) References Cited

U.S. PATENT DOCUMENTS

| | | | |
|---|---|---|---|
| 6,891,895 B1 | 5/2005 | Onno et al. .................... 375/260 |
| 7,113,643 B2 | 9/2006 | Le Leannec et al. ......... 382/235 |
| 7,190,838 B2 | 3/2007 | Le Leannec et al. ......... 382/233 |
| 7,212,678 B2 | 5/2007 | Brown et al. .................. 382/240 |
| 7,215,819 B2 | 5/2007 | Onno et al. .................... 382/240 |
| 7,260,264 B2 | 8/2007 | Guillou et al. ............... 382/232 |
| 7,281,033 B2 | 10/2007 | Le Leannec et al. ......... 709/217 |
| 7,382,923 B2 | 6/2008 | Onno ............................. 382/233 |
| 7,499,546 B2 | 3/2009 | Donescu et al. .............. 380/217 |
| 7,571,316 B2 | 8/2009 | Onno et al. .................... 713/160 |
| 7,580,578 B1 | 8/2009 | Onno et al. .................... 382/232 |
| 7,746,332 B2 | 6/2010 | Le Leannec et al. ......... 345/204 |
| 7,912,985 B2 | 3/2011 | Le Leannec et al. ......... 709/247 |
| 2003/0001757 A1* | 1/2003 | Kondo et al. .................... 341/50 |
| 2005/0175100 A1* | 8/2005 | Yamane et al. ........... 375/240.16 |
| 2007/0019721 A1 | 1/2007 | Le Leannec et al. ..... 375/240.1 |
| 2007/0147497 A1 | 6/2007 | Bao et al. ................. 375/240.03 |
| 2007/0223033 A1 | 9/2007 | Onno et al. ................... 358/1.15 |
| 2008/0075170 A1 | 3/2008 | Henocq et al. .......... 375/240.16 |
| 2008/0095231 A1 | 4/2008 | Onno et al. .............. 375/240.12 |
| 2008/0130736 A1 | 6/2008 | Onno et al. .............. 375/240.01 |
| 2008/0131011 A1 | 6/2008 | Le Leannec et al. ......... 382/238 |
| 2008/0170793 A1* | 7/2008 | Yamada et al. ............... 382/232 |
| 2008/0240257 A1* | 10/2008 | Chang et al. .................. 375/241 |
| 2009/0226107 A1* | 9/2009 | Lin ................................ 382/238 |
| 2009/0251531 A1* | 10/2009 | Marshall et al. ............... 348/42 |
| 2009/0278956 A1 | 11/2009 | Le Leannec et al. ..... 348/222.1 |
| 2009/0290648 A1 | 11/2009 | Onno et al. .............. 375/240.27 |
| 2009/0310674 A1 | 12/2009 | Le Leannec et al. ... 375/240.12 |
| 2010/0142622 A1 | 6/2010 | Le Leannec et al. ... 375/240.16 |
| 2010/0296000 A1 | 11/2010 | Henocq et al. ............... 348/723 |
| 2010/0316139 A1 | 12/2010 | Le Leannec et al. ... 375/240.29 |
| 2011/0013701 A1 | 1/2011 | Henocq et al. .......... 375/240.25 |
| 2011/0038557 A1 | 2/2011 | Closset et al. ................. 382/251 |
| 2011/0110431 A1 | 5/2011 | Laroche et al. ......... 375/240.16 |
| 2011/0188573 A1 | 8/2011 | Laroche et al. ......... 375/240.12 |

OTHER PUBLICATIONS

"Advanced Video Coding for Generic Audiovisual Services", ITU-T Recommendation H.264, Mar. 2005.

Parameswaran, V. et al., "Adapating Quantization Offset in Multiple Description Coding for Error Resilient Video Transmission", Journal of Visual Communication and Image Representation, vol. 20, No. 7, Jul. 12, 2009, pp. 491-503, XP026467882, ISSN: 1047-3203.

Wedi, T. et al., "Quantization Offsets for Video Coding", Conference Proceedings/ IEEE International Symposium on Circuits and Systems (ISCAS), May 23, 2005, pp. 324-327, XP010815543, ISBN 978-0-7803-8834-5.

International Search Report in counterpart Application No. PCT/IB2010/054638 dated Jan. 7, 2011.

* cited by examiner

METHOD AND DEVICE FOR PROCESSING A VIDEO SEQUENCE

The present invention relates to a method and device for the processing, in particular the coding or decoding or more generally compression or decompression, of a video sequence consisting of a series of digital images.

Video compression algorithms such as those standardized by the standardization bodies ITU, ISO and SMPTE use the spatial and temporal redundancies of the images in order to generate data bit streams of reduced size compared with these video sequences. Such compressions make the transmission and/or storage of the video sequences more effective.

FIGS. 1 and 2 show respectively the diagram of a conventional video encoder 10 and the diagram of a conventional video decoder 20 in accordance with the video compression standard H.264/MPEG-4 AVC ("Advanced Video Coding").

The latter is the result of the collaboration of the Video Coding Expert Group (VCEG) of the ITU and of the Moving Picture Experts Group (MPEG) of the ISO, in the form in particular of a publication "*Advanced Video Coding for Generic Audiovisual Services*" (March 2005).

FIG. 1 shows a diagram of a video encoder 10 of the H.264/AVC type or one of its predecessors.

The original video sequence 101 is a succession of digital images "images i". As is known per se, a digital image is represented by one or more matrices the coefficients of which represent pixels.

According to the standard H.264/AVC, the images are divided into slices. A slice is a part of the image or the entire image. These slices are divided into macroblocks, generally blocks of size 16 pixels×16 pixels, and each macroblock may in its turn be divided into different sizes of data blocks 102, for example 4×4, 4×8, 8×4, 8×8, 8×16, 16×8. The macroblock is the coding unit in the H.264 standard During video compression, each block of an image being processed is predicted spatially by an "Intra" predictor 103, or temporally by an "Inter" predictor 105. Each predictor is a block of pixels issuing from the same image or another image, from which a difference block (or "residual") is derived. The identification of the predictor block and the coding of the residual make it possible to reduce the quantity of information actually to be encoded.

In the "Intra" prediction module 103, the current block is predicted by means of an "Intra" predictor, a block of pixels constructed from the information on the current image already encoded.

With regard to the "Inter" coding, an estimation of motion 104 between the current block and reference images 116 is made in order to identify, in one of these reference images, a block of pixels to use it as a predictor of this current block. The reference images used consist of images in the video sequence that have already been coded and then reconstructed (by decoding).

Generally, the motion estimation 104 is a block matching algorithm (BMA).

The predictor obtained by the algorithm is then subtracted from the current data block to be processed so as to obtain a difference block (block residual). This step is called "motion compensation" 105 in the conventional compression algorithms.

These two types of coding thus supply several texture residuals (the difference between the current block and the predictor block), which are compared in a module for selecting the best coding mode 106.

If "Intra" coding is selected, an item of information for describing the "Intra" predictor used is coded (109) before being inserted in the bit stream 110.

If the module for selecting the best coding mode 106 chooses "Inter" coding, motion information is coded (109) and inserted in the bit stream 110. This motion information is in particular composed of a motion vector (indicating the position of the predictor block in the reference image relative to the position of the block to be predicted) and an image index among the reference images.

The residual selected by the module of choice 106 is then transformed (107) by means of a discrete cosine transform DCT, and then quantized (108). The coefficients of the quantized transformed residual are then coded by means of an entropic or arithmetic coding (109) and then inserted in the compressed bit stream 110.

In the remainder of the document, reference will essentially be made to entropic coding. However, a person skilled in the art is in a position to replace it with arithmetic coding or any other suitable coding.

In order to calculate the "Intra" predictors or to make an estimation of the motion for the "Inter" predictors, the encoder performs a decoding of the blocks already encoded by means of a so-called "decoding" loop (111, 112, 113, 114, 115, 116). This decoding loop makes it possible to reconstruct the blocks and images from the quantized transformed residuals.

Thus the quantized transformed residual is dequantized (111) by applying the reverse quantization to that provided at step 108 and reconstructed (112) by an application of the reverse transform to that of the step 109.

If the residual comes from an "Intra" coding 103, the corresponding "Intra" predictor is added to this residual (113) in order to recover the original block modified by the losses resulting from a transformation with loss, here quantization operations.

If the residual on the other hand comes from an "Inter" coding 105, the block pointed to by the current motion vector (this block belongs to the reference image 116 referred by the current image index) is added to this decoded residual (114). In this way the original block is obtained modified by the losses resulting from the quantization operations.

In order to attenuate, within the same image, the block effects created by heavy quantization of the results obtained, the encoder includes a "deblocking" filter 115, the purpose of which is to eliminate these block effects, in particular the artificial high frequencies introduced at the boundaries between blocks. The deblocking filter 115 smoothes the borders between the blocks in order to visually attenuate these high frequencies created by the coding. Such a filter being known from the art, it will not be described in any further detail here.

The filter 115 is thus applied to an image when all the blocks of pixels of this image have been decoded.

The filtered images, also called reconstructed images, are then stored as reference images 116 in order to allow the subsequent "Inter" predictions taking place during the compression of the following images of the current video sequence.

In the remainder of the explanations, the information resulting from this decoding loop used in the prior art, that is to say by reversing in particular the quantization and transformation with conventional parameters, will be called "conventional". Thus a "conventional reconstructed image" will henceforth be spoken of.

In the context of the H.264 standard, it is possible to use several reference images 116 for the estimation and motion compensation of the current image, with a maximum of thirty two reference images.

In other words, the motion estimation is carried out on N images. Thus the best "Inter" predictor of the current block, for the motion compensation, is selected in one of the multiple reference images. Consequently two adjoining blocks may have two predictor blocks that come from two distinct reference images. This is in particular the reason why, in the compressed bit stream, the index of the reference image (in addition to the motion vector) used for the predictor block is indicated.

FIG. 3 illustrates this motion compensation by means of a plurality of reference images. In this figure, the image 301 represents the current image being coded corresponding to the image i in the video sequence.

The images 302 to 307 correspond to the images i-n to i-1 that were previously encoded and then decoded (that is to say reconstructed) from the compressed video sequence 110.

In the example illustrated, three reference images 302, 303 and 304 are used in the Inter prediction of blocks of the image 301. To make the graphical representation readable, only a few blocks of the current image 301 have been shown, and no Intra prediction is here illustrated.

In particular, for the block 308, an Inter predictor 311 belonging to the reference image 303 is selected. The blocks 309 and 310 are respectively predicted by the blocks 312 of the reference image 302 and 313 of the reference image 304. For each of these blocks a motion vector (314, 315, 316) is coded and transmitted with the reference image index (302, 303, 304).

The use of multiple reference images—the recommendation of the aforementioned VCEG group recommending limiting the number of reference images to four—is both a tool for resisting errors and a tool for improving the compression efficacy.

This is because, with a suitable selection of reference images for each of the blocks of a current image, it is possible to limit the effect of the loss of a reference image or a part of a reference image.

Likewise, if the selection of the best reference image is estimated block by block with a minimal rate/distortion criterion, this use of several reference images makes it possible to obtain significant gains compared with the use of a single reference image.

However, to obtain these improvements, it is necessary to make a motion estimation for each of the reference images, which increases the calculation complexity of a video coder.

In addition, all the reference images need to be kept in memory, increasing the memory space necessary in the encoder.

Thus the calculation and memory complexity, necessary to the use of several reference images according to the H.264 standard, may prove to be incompatible with some video applications or equipment, the calculation and memory capacities of which are limited. Such is the case for example with portable telephones, photographic apparatus or digital cameras.

Moreover, it should be noted that, when the selection of the best predictor block is base on the rate/distortion criterion, a large majority of the pixels of the current image (on average 85%) have as their predictor pixels coming from the reference image closest in terms of "temporal" distance.

This majority dependency on a single reference image is however not optimal in terms of compression performance.

FIG. 2 shows a global diagram of a video decoder 20 of the H.264/AVC type. The decoder 20 receives as an input a bit stream 201 corresponding to a video sequence 110 compressed by an encoder of the H.264/AVC type, like the one in FIG. 1.

During the decoding process, the bit stream 201 is first of all decoded entropically (202).

The residual of the current block is then dequantized (203) by means of quantization the reverse of that provided at 108, and then reconstructed (204) by means of transformation the reverse of that provided at 107.

The decoding of the data in the video sequence is then carried out image by image and, within an image, block by block.

The "Inter" or "Intra" coding mode for the current block is extracted from the bit stream 201 and decoded entropically.

If the coding of the current block is of the "Intra" type, the number of the predictor is extracted from the bit stream and decoded entropically. The Intra predictor block associated with this index is recovered from the data already decoded of the current image.

The residual associated with the current block is recovered from the bit stream 201 and then decoded entropically. Finally, the Intra predictor block recovered is added to the residual thus dequantized and reconstructed in the reverse Intra prediction module (205) in order to obtain the decoded block.

If the coding mode of the current block indicates that this block is of the "Inter" type, the motion information is extracted from the bit stream 201 and decoded (202).

This motion information is used in the reverse motion compensation module 206 in order to determine the "Inter" predictor block contained in the reference images 208 of the decoder 20. In a similar manner to the encoder, these reference images 208 are composed of images that precede the image currently being decoded and are reconstructed from the bit stream (and therefore decoded previously).

The residual associated with the current is, here also, recovered from the bit stream 201 and then decoded entropically. The Inter predictor block determined is then added to the thus dequantized residual reconstructed in the reverse motion compensation module 206 in order to obtain the decoded block.

At the end of the decoding of all the blocks of the current image, the same deblocking filter 207 as the filter (115) provided at the encoder is used to eliminate the block effects contained in the reference images 208.

The images thus decoded constitute the output video signal 209 of the decoder, which can then be displayed and used.

These decoding operations are similar to the decoding loop of the decoder. In this regard, the illustration in FIG. 3 also applies to the decoding.

In a symmetrical fashion to the coding, the decoder according to the H.264 standard requires the use of several reference images.

There is known, from publications EP 1 615 441, US 2007/147497 and "Adapting quantization offset in multiple description coding for error resilient video transmission" (Parameswaran V et al., Journal of visual communication and image representation, Vol. 20, No 7, pp. 491-503, Jul. 12, 2009), multiple description coding wherein several multiple description signals of the same initial signal are coded using conventional coding by prediction. However, every image of each multiple description signal is coded by prediction using reconstructions selected from single reconstructions of images in the sequence.

The present invention aims to mitigate at least one of the drawbacks of the techniques of the prior art, in order for example to improve the "Inter" predictors used during the compression of the video sequences.

For this purpose, the invention concerns in particular a method of processing, in particular coding or decoding, a video sequence consisting of a series of digital images comprising a current image to process, the method comprising the steps consisting of:

generating a first reconstruction of a first image in the sequence, so as to obtain a first reference image;

generating a second reconstruction of the first image different from the first reconstruction, so as to obtain a second reference image; and predicting at least part of said current image from at least one reference image selected from the generated first and second reference images.

The invention also may be seen as a method of processing a video sequence consisting of a series of digital images comprising a current image to process, the method comprising the steps of:

selecting at least one reference image from a plurality of reference images, which plurality of reference images includes several different reconstructions of the same image for at least one image in the sequence;

predicting at least part of said current image from the selected reference image or images.

This may further comprise generating several different reconstructions of the same image for several images in the sequence, and may comprise the operations as disclosed thereafter.

According to the invention, the reference images result from several different reconstructions of one or more other images of the video sequence (generally among those that were previously encoded/decoded).

Just as for the H.264/AVC standard, the present invention enables the use of a large number of reference images, thus offering a better compression than by using a single reference image.

In addition, the invention helps to reduce the memory space necessary for the storage of the same number of reference images at the encoder or decoder. This is because a single reference image (generally the one reconstructed according to the techniques known from the prior art) can be stored and, by producing on the fly the other reference images corresponding to the same image in the video sequence (the second reconstruction), several reference images are obtained for a minimal occupied memory space.

The inventors have also observed that, for many sequences, the use according to the invention of reference images reconstructed from the same image are revealed to be more effective than the use of the multiple "conventional" reference images as in H.264, which are images coded and then decoded taken at several time offsets from the image to process in the video sequence. The result is a reduction in the entropy of the "Inter" texture residuals and/or the quality of the "Inter" predictor blocks.

In one embodiment, the said reconstructions are carried out from a quantized version of said first image and said first and second reconstructions differ through different reverse quantizations. In general terms, the multiple reconstructions can be applied as soon as the coding of the images in the video sequences involves a transformation with loss.

This arrangement makes it possible to have reference images suited to the video compression algorithms with loss including quantization mechanisms.

In particular, said quantized version of the first image is composed of blocks of data each formed from a set of coefficients, and the different reverse quantizations use, for the same data block coefficient of the first image, different quantization offsets. This embodiment makes it possible to control the quantization ranges and to offer, without any technical complexity, predictors of better quality for certain types of video sequence. A block coefficient is an element of a block residual transformed (and then quantized) by the transform of the H.264 standard or a pixel of a residual then quantized, in the case of a coding without transformation.

In particular, provision can be made for a single block coefficient to have different offsets between the first and second reconstructions. So to obtain a less amount of additional data to be transmitted from a coder to a decoder. As an alternative, it is possible to use different offsets for several block coefficients at the same time, but this induces a bigger amount of additional data to be transmitted to the decoder.

According to one feature of the invention, the method comprises a step of automatic selection of at least one block coefficient and its associated quantization offset in order to generate a said second reconstruction different from the first reconstruction. Various alternative criteria can then be used, as described below.

In one embodiment, said first and second reconstructions of the first image are generated in parallel from said first image. Thus each of the reference images is generated separately by proceeding with the complete reconstruction from the first image, generally from a quantized version.

According to a variant, said step consisting of generating a second reconstruction comprises:

the determination of at least one corrective residual from at least one second-reconstruction parameter and a block of coefficients all equal to zero; and the addition of said at least one corrective residual to said first reference image so as to obtain said second reference image.

A second-reconstruction parameter is for example composed of at least one block coefficient (for example, using the number or indicia of the coefficient within the block, according to a predetermined convention of how ordering coefficients within a block) and its quantization offset.

By using as many reconstruction parameters as desired, it is possible to obtain several other reference images.

This arrangement has reduced complexity compared with the variant referred to above, with equivalent results in terms of rate/distortion.

This is because, in this variant, the complete reconstruction of only one image is carried out and then, to produce the other reference images, corrections are added that are simpler to calculate. This arrangement is thus simple to implement on the fly. In general, said first reconstruction can correspond to a "conventional" reconstruction provided in a standard coding format for generating an output video image.

It should also be noted that this embodiment applies in particular to the second partial reconstruction solely of the blocks used during decoding predictions for a current image. This is because there is then need to apply the corrective residuals only to these blocks.

In particular, the determination of a corrective residual comprises a reverse quantization of said block of coefficients all equal to zero, said reverse quantization using, for at least one block coefficient, a quantization offset different from the one used for the first reconstruction.

According to a particular characteristic, said processing of the video sequence comprises a transformation of image blocks using several block sizes, and said step consisting of generating a second reconstruction uses corrective residuals of only one size, generally the smallest of said block sizes. Performance is similar to the use of corrective residuals of sizes adapted to those of the blocks of the image obtained, with reduced complexity of implementation.

In addition, when the processing of the video sequence includes a block transformation using blocks with a given block size, the step of generating at least a second reconstruction uses corrective residuals with the same size as the block size.

In one embodiment, said prediction comprises an estimation and a motion compensation of at least one data block of said current, from the reference images generated by reconstruction.

In particular, the method comprises, for at least one data block of said current image, the calculation of the motion compensation with respect to each of the reference images and then the selection of one of said reference images according to a selection criterion, typically according to the best rate/distortion ratio, so as to process said data block.

In one embodiment of the invention, for predicting said at least part of the current image, said reference images comprise reconstructions of a single first image in the sequence. In this way the memory space used is reduced since only one image is stored in the encoder and decoder, the reconstructions being for example able to be generated on the fly.

In particular, said single first image is the already reconstructed image that is the closest one in time to the current image within said video sequence. The concept of "in time" is here to be compared to the temporal dimension of video sequence, a succession of images over time. This arrangement affords, at less cost, a better general prediction of the whole of the image to be processed. In addition, by virtue of the other reference images resulting from the different reconstructions according to the invention, the "Inter" predictors and the resulting compression are further improved.

According to one characteristic of the invention, the images are made of a plurality of data blocks, and a second reconstruction of the first image comprises the reconstruction solely of the blocks of said first image used during the prediction of the at least part of the current image. This arrangement applies in particular during the decoding of a coded sequence since, in this case, only these blocks are useful. In this way the memory space used at the decoder is limited. The generation on the fly of the reconstructions is also simplified, where applicable.

Naturally, on decoding, the "conventional" reconstruction, that is to say as defined in a standard coding format, is carried out on all the blocks of the image so as to generate the output video image. The latter can moreover be the only complete reference image that is stored.

In one embodiment of the invention, the method comprises the replacement of said first reference image previously stored in memory with a said second reference image. In this way, the storage of the reference images is optimized by keeping for example only the most effective in terms of compression according to a rate/distortion ration.

In particular, said first reference image stored is an image reconstructed according to a reconstruction provided in a standard coding format, in particular in order to generate an output video image (called a conventional reference image).

In this case, only images reconstructed with reconstruction parameters other than those corresponding to the "conventional" treatment of the image are kept as reference images. The reference images obtained are thus all different from those conventionally obtained by the H.264 standard for example.

Various criteria for estimating the opportunity to proceed with a replacement can be provided for as described hereinafter.

In one embodiment, the processing comprises the coding of said video sequence as a coded stream, and the method comprises a step of signaling, in the coded stream resulting from said coding, information (such as the quantization offsets and their associated block coefficients) representing parameters of said reconstructions that ended up with said reference images. There is thus made available to the decoder, and at less cost, the information useful for the decoding of the compressed video sequence.

In one embodiment of the invention, the method comprises the prediction of part of the current image from said first reference image corresponding to a first image in the sequence, and the prediction of at least one other part of said current image from a second reference image corresponding to the same first image in the sequence. Thus the same video image is coded/decoded with reference to two different reconstructions of the same previously coded/encoded image.

The invention also relates to a device (a coder or decoder for example) for processing a video sequence consisting of a series of digital images comprising a current image to process, comprising:
  a generation means able to generate a first reconstruction of a first image in the sequence, so as to obtain a first reference image, and to generate a second reconstruction of said first image different from the first reconstruction, so as to obtain a second reference image;
  a prediction means able to predict at least part of said current image from at least one reference image selected from said first and second reference images.

The processing device has advantages similar to those of the processing method disclosed above, in particular to allow the reduced use of memory resources, to perform calculations of reduced complexity or to improve the Inter predictors used during the motion compensation.

The device may also concern a device for processing a video sequence consisting of a series of digital images comprising a current image to process, comprising:
  a selection means for selecting at least one reference image from a plurality of reference images, which plurality of reference images includes several different reconstructions of the same image for at least one image in the sequence;
  a prediction means for predicting at least part of said current image from the selected reference image or images.

Optionally, the device can comprise means relating to the features of the method disclosed previously.

In particular, the device can comprise an assembly for decoding a coded image in order to produce a decoded image, said decoding assembly comprising:
  a first reverse quantization module for dequantizing said coded image according to first parameters so as to generate said first reconstruction of said coded image,
  a module for generating reconstruction parameters able to generate second parameters different from said first parameters, and at least a second reverse quantization module for generating a second reconstruction of said coded image from said second parameters.

In a variant, the device comprises:
an assembly for decoding a coded image in order to produce a decoded image corresponding to said first reconstruction of the image,
a module for calculating at least one corrective residual from a null data block and second parameters, and for applying said at least one corrective residual to said decoded image so as to generate said at least one second reconstruction.

In particular, the device can comprises a module for generating reconstruction parameters able to generate said second parameters different from first parameters used during a reverse quantization of said decoding assembly.

According to one characteristic, said parameter generation module is arranged to automatically determine and generate said parameters among a plurality of parameters.

The invention also concerns a coded video signal in a video sequence consisting of a series of digital images comprising a plurality of binary data representing a plurality of coded images of the video sequence, characterized in that binary data representing coded images makes reference to at least two different reconstructions of the same preceding image represented by other binary data within the signal, and the signal further comprises binary information representing parameters of said different reconstructions of the previous coded image from said other binary data. It should be noted that certain "conventional" reconstruction parameters can be implicit in the coding used, certain other optional parameters of this "conventional" reconstruction being able to be provided in the coded stream. According to the invention, the coded stream also comprises the parameters relating to the "second" reconstructions so that the decoder can obtain the appropriate reference images for the decoding of the coded sequence.

The invention also concerns an information storage means, possibly totally or partially removable, able to be read by a computer system, comprising instructions for a computer program adapted to implement the processing method according to the invention when this program is loaded into and executed by the computer system.

The invention also concerns a computer program able to be read by a microprocessor, comprising portions of software code adapted to implement the processing method according to the invention, when it is loaded into and executed by the microprocessor.

The information storage means and computer program have features and advantages similar to the methods that they implement.

Other features and advantages of the invention will also emerge from the following description, illustrated by the accompanying drawings, in which.

According to the invention, the method of processing a video sequence of images comprises the generation of two or more different reconstructions of at least one image preceding, in the video sequence, the image to be processed (coded or decoded), so as to obtain at least two reference images for the motion compensation.

The processing operations on the video sequence may be of different natures, including in particular video compression algorithms. In particular, the video sequence may be subjected to a coding with a view to transmission or storage.

For the remainder of the description, the concern will more particularly be with a processing of the motion compensation type applied to an image in the sequence, in the context of video compression. However, the invention could be applied to other processing operations, for example to the estimation of movements during sequence analysis.

Figure 3:
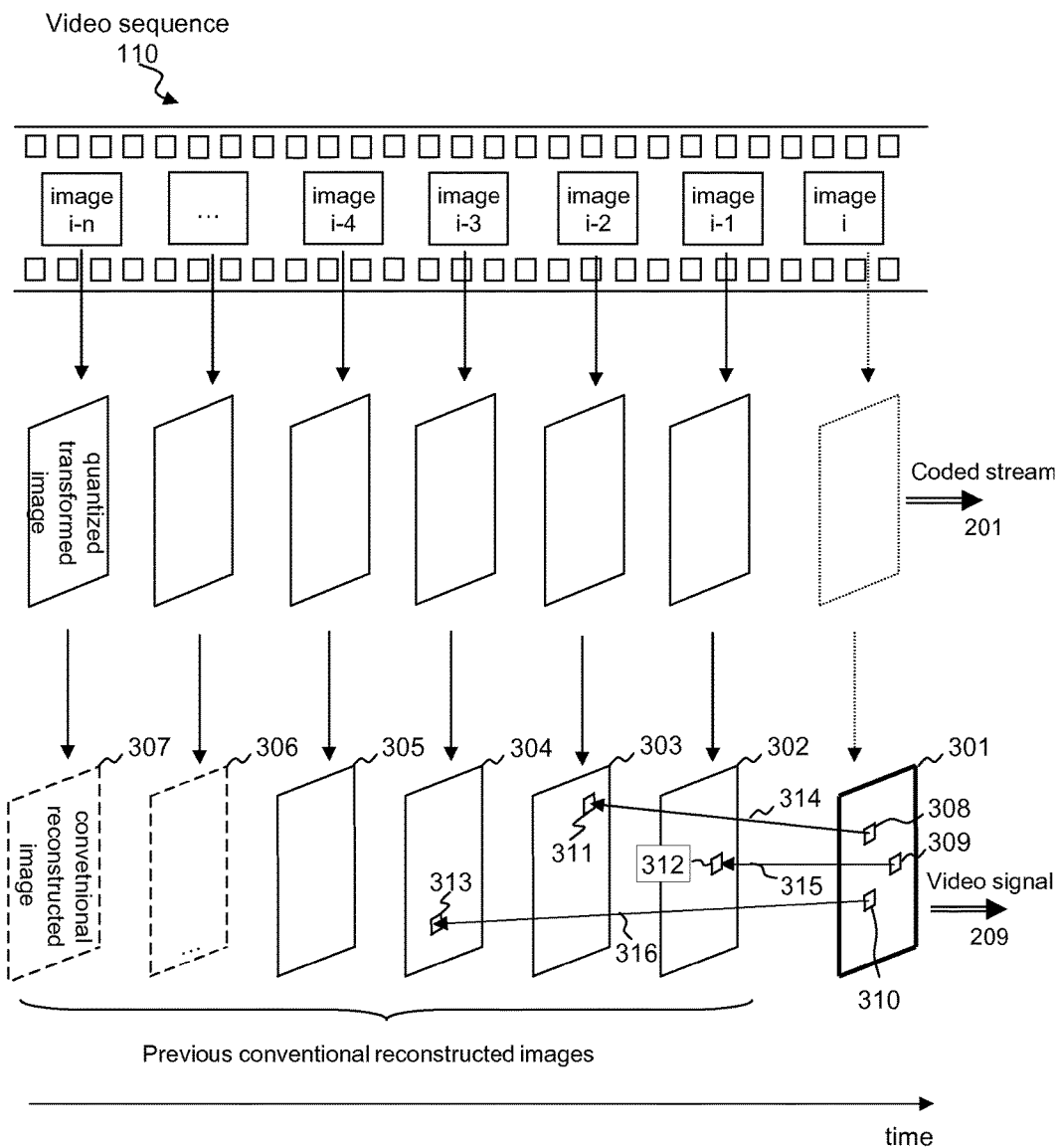
FIG. 3 illustrates the principle of the motion compensation of a video coder according to the prior art.
Figure 4:
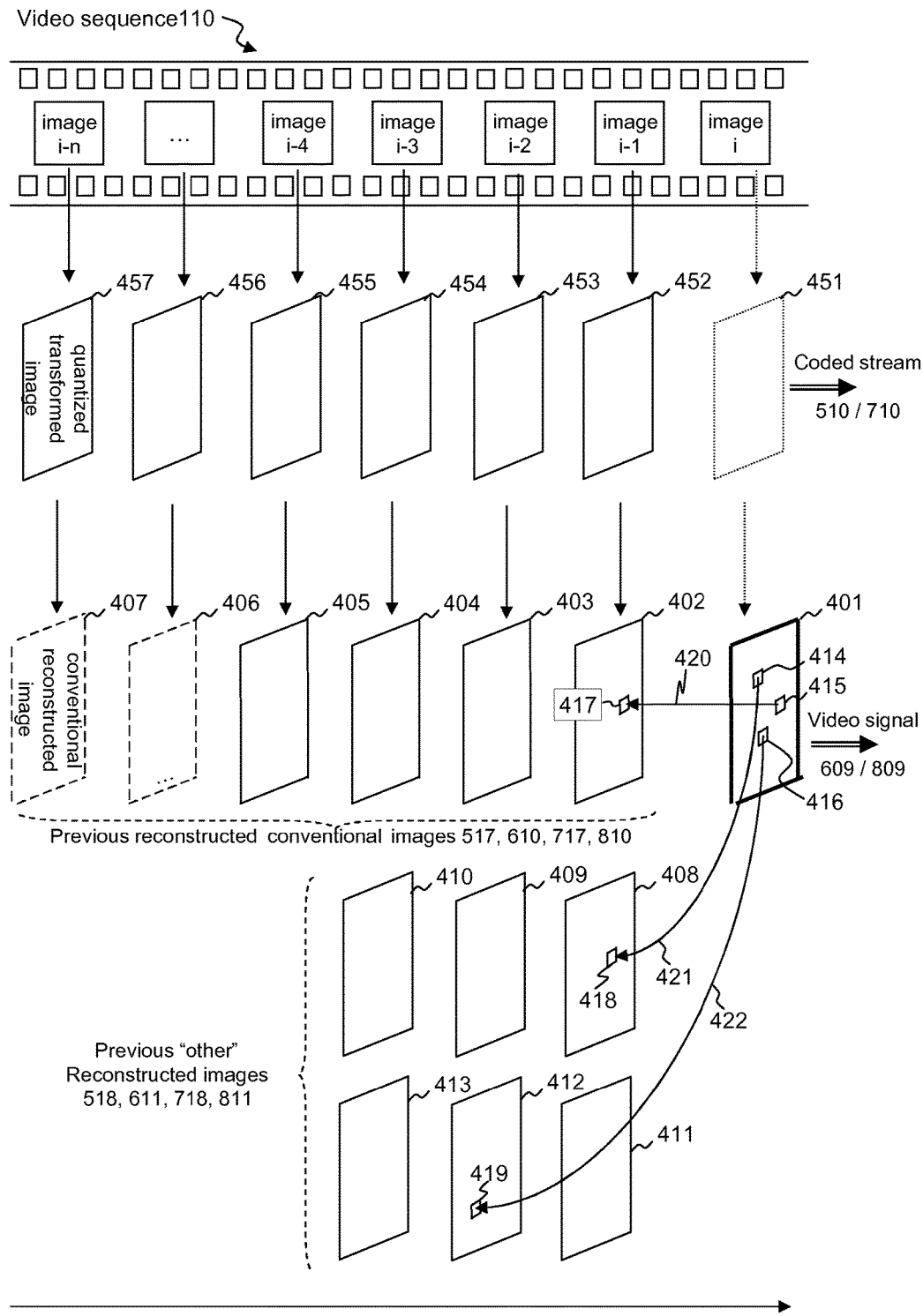
FIG. 4 illustrates the principle of the motion compensation of a coder including multiple reconstructions of images in the list of reference images, according to the present invention.

FIG. 4 illustrates a motion compensation implementing the invention, in a representation similar to that of FIG. 3.

The "conventional" reference images 402 to 405, that is to say those obtained according to the techniques of the prior art, and the new reference images 408 to 413 generated by the present invention, are shown on an axis perpendicular to the time axis (defining the video sequence 110) in order to show which images generated by the invention correspond to one and the same conventional reference image.

More precisely, the conventional reference images 402 to 405 are the images in the video sequence that were previously encoded and then decoded by the decoding loop; these images therefore correspond to the images of the video signal 209 of the decoder.

The images 408 and 411 result from other decodings of the image 452, also called "second" reconstructions of the image 452. The "second" decodings or reconstructions mean decodings/reconstructions with parameters different from those used for the conventional decoding/reconstruction (according to a standard coding format for example) provided for generating the decoded video signal 209.

Likewise, the images 409 and 412 are second decodings of the image 403. Finally, the images 410 and 413 are second decodings of the image 404.

According to the invention as illustrated in this example, the blocks of the current image (i, 401) which is to be processed (compressed) can each be predicted by a block of the previously decoded images 402 to 407 or by a block of a "second" reconstruction 408 to 413 of one of these images 452 to 454.

In this figure, the block 414 of the current image 401 has, as its Inter predictor block, the block 418 of the reference image 408, which is a "second" reconstruction of the image 402. The block 415 of the current image 401 has, as a predictor block, the block 417 of the conventional reference image 402. Finally, the block 416 has, as predictor, the block 419 of the reference image 413, which is a "second" reconstruction of the image 403.

In general terms, the "second" reconstructions 408 to 413 of an image or of several conventional reference images 402 to 407 can be added to the list of reference images 116, 208, or even replace one or more of these conventional reference images.

It should be noted that, generally, it is more effective to replace the conventional reference images with "second" reconstructions, and to keep a limited number of new reference images (multiple reconstructions), rather than to routinely add these new images to the list. This is because a large number of reference images in the list increases the rate necessary for the coding of an index of these reference images (in order to indicate to the decoder which to use).

Likewise, it has been observed that the use of multiple "second" reconstructions of the first reference image (the one that is the closest in time to the current image to be processed, generally the image that precedes it) is more effective than the use of multiple reconstructions of a reference image further away in time.

In order to identify the reference images used during encoding, the coder transmits, in addition to the number and serial number of reference images, an indication or flag to indicate whether the reference image associated with the serial number is a conventional reconstruction or a "second" reconstruction. If the reference image comes from a "second" reconstruction according to the invention, the different parameters ("number of the coefficient" and "reconstruction offset value" as described subsequently) are transmitted to the decoder, for each of the reference images used.

In a variant of this signaling, the coder transmits to the decoder the number of reference images, and then it indicates the number of the first reference image followed by the number of reconstructions of this image. Considering that the first reconstruction is routinely a conventional reconstruction, the parameters "serial number of coefficient" and "reconstruction offset value" are transmitted solely for the other reconstructions. If the number of reference images is not reached, the coder therefore inscribes the serial number of another reference image followed by the number of reconstructions used for this image.

With reference to FIGS. 5 to 8, a description is now given of two embodiments of the invention for generating multiple reconstructions of a conventional reference image, both during the encoding of a video sequence, and during the decoding of an encoded sequence. The second embodiment (FIGS. 7 and 8) involves approximations of the first embodiment (FIGS. 5 and 6) in order to offer less complexity while keeping similar performance in terms of rate/distortion of the encoded/decoded video sequence.

Figure 1:
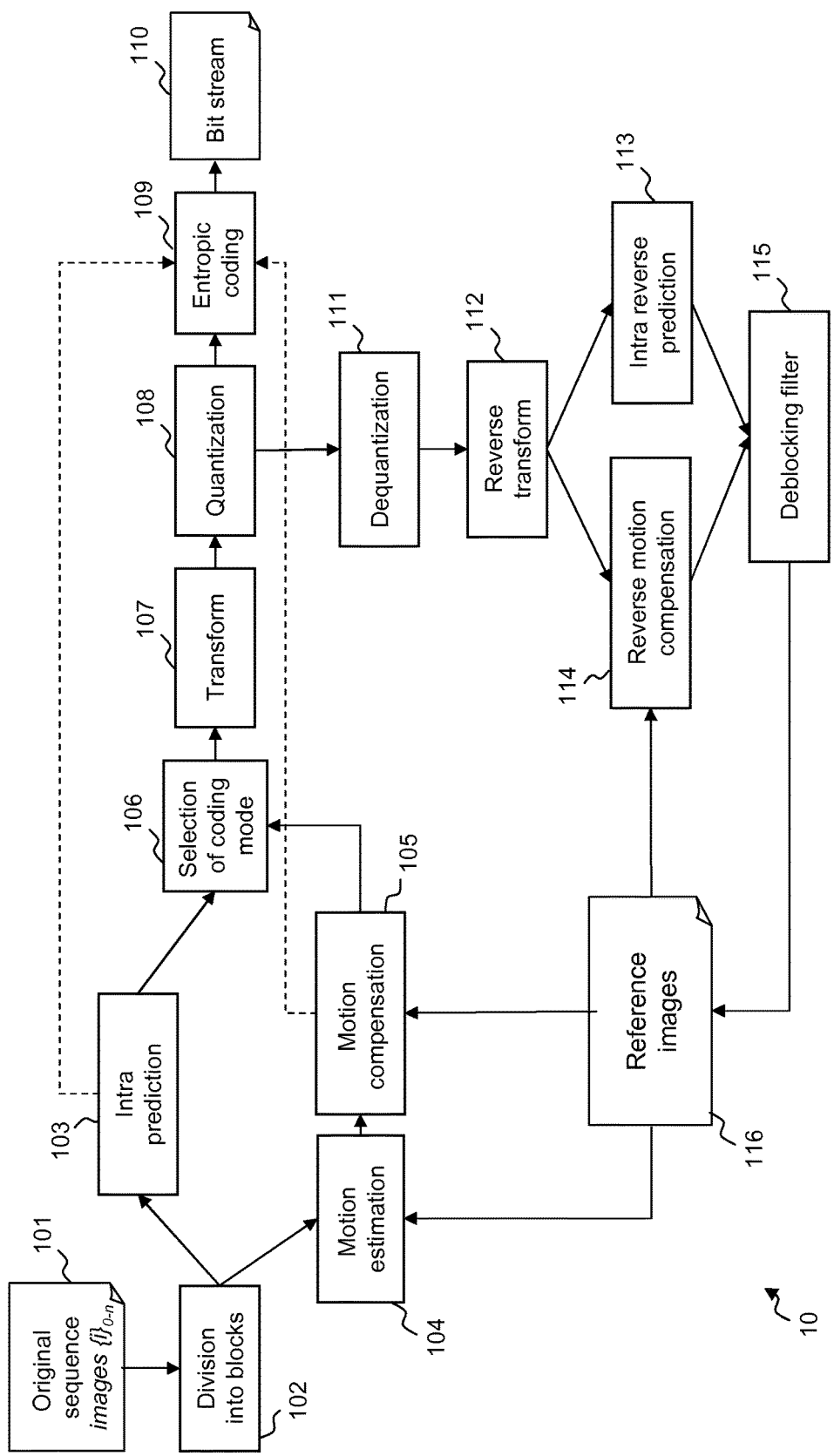
FIG. 1 shows the global diagram of a video encoder of the prior art.
Figure 5:
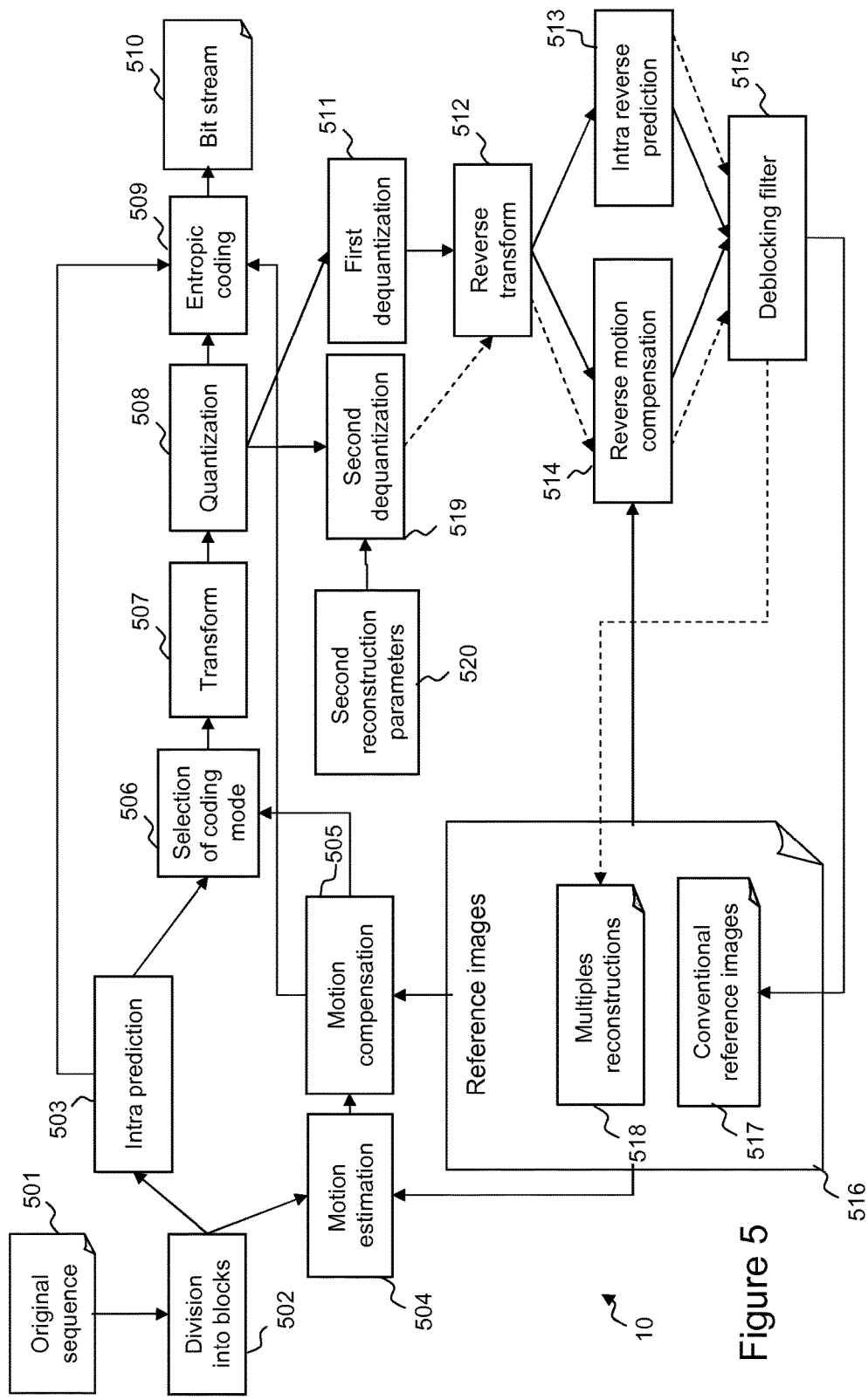
FIG. 5 shows the global diagram of a video encoder according to a first embodiment of the invention.

With reference to FIG. 5, a video encoder 10 according to the first embodiment of the invention, comprises modules 501 to 515 for processing a video sequence with decoding loop, similar to the modules 101 to 115 in FIG. 1.

In particular, according to the standard H.264, the quantization module 108/508 performs a quantization of the residual obtained after transformation 107/507, for example of the DCT type, on the residual of the current pixel block. The quantization is applied to each of the N coefficients of this residual block (as many coefficients as there are in the initial pixel block). The calculation of a matrix of DCT coefficients and the path of the coefficients within the matrix of DCT coefficients are concepts widely known to persons skilled in the art and will not be detailed further here. Such a scan through the matrix of DCT coefficients makes it possible to obtain an order of coefficients in the block, and therefore an index number for each of them.

Thus, if the i-th coefficient of the residual of the current block is called $W_i$ (with i from 0 to M−1 for a block containing M coefficients), the quantized coefficient $Z_i$ is obtained by the following formula:

$$Z_i = \text{int}\left(\frac{|W_i| + f_i}{q_i}\right) \cdot \text{sgn}(W_i)$$

where $q_i$ is the quantizer associated to the i-th coefficients, the value of which depends both on a quantization step denoted QP and the position (that is to say the number or index) of the coefficient $W_i$ in the transformed block.

This is because the quantizer $q_i$ comes form a so-called quantization matrix, each element of which (the values $q_i$) is predetermined. The elements are generally fixed so as to more greatly quantize the high frequencies.

Moreover, the function int(x) supplies the integer part of the value x and the function sgn(x) gives the sign of the value x.

Finally, $f_i$ is the quantization offset, which makes it possible to centre the quantization interval. If this offset is fixed, it is generally equal to $q_i/2$.

By the end of this step, for each image, the quantized residual blocks ready to be coded for generating the bit stream 510 are obtained. In FIG. 4, these images bear the references 451 to 457.

The reverse quantization (or dequantization) process, represented by the module 111/511 in the decoding loop of the encoder 10, provides for the i-th dequantized coefficient $W_i'$ to be obtained by the following formula:

$$W_i' = (q_i \cdot |Z_i| - \Theta_i) \cdot \text{sgn}(Z_i)$$

In this formula, $Z_i$ is the i-th quantized coefficient, calculated with the above quantization equation. $\Theta_i$ is the reconstruction offset that makes it possible to center the reconstruction interval. By nature, $\Theta_i$ must belong to the interval $[-|f_i|; |f_i|]$. This is because there exists a value of $\Theta_i$ belonging to this interval such that $W_i' = W_i$. This offset is generally equal to zero.

It should be noted that this formula is also applied by the decoder 20, at the dequantization 203 (603 as described hereinafter with reference to FIG. 6).

Still with reference to FIG. 5, the box 516 contains the reference images in the same way as the box 116 in FIG. 1, that is to say the images contained in this module are used for the motion estimation 504, the motion compensation 505 during the coding of a block of pixels in the video sequence, and the reverse motion compensation 514 in the decoding loop for generating the reference images.

To illustrate the present invention, the so-called "conventional" reference images 517 have been shown schematically, within the box 516, separately from the reference images 518 obtained by "second" decodings/reconstructions according to the invention.

In this first embodiment of the invention, the "second" reconstructions of an image are constructed within the decoding loop, as shown by the modules 519 and 520, allowing at least a "second" decoding by dequantization (519) using "second" reconstruction parameters (520).

Thus, for each of the blocks of the current image, two dequantization processes (reverse quantization) 511 and 519 are used: the conventional reverse quantization 511 for generating a first reconstruction and the different reverse quantization 519 for generating a "second" reconstruction of the block (and therefore of the current image).

It should be noted that, in order to obtain multiple "second" reconstructions of the current reference image, a larger number of modules 519 and 520 can be provided in the encoder 10, each generating a different reconstruction with different parameters as explained below. In particular, all the multiple reconstructions can be executed in parallel with the conventional reconstruction by the module 511.

Information on the number of multiple reconstructions and the associated parameters are inserted in the coded stream 510 for the purpose of informing the decoder 20 of the values to be used.

The module 519 receives the parameters of a second reconstruction 520 different from the conventional reconstruction. The functioning of this module 520 will be described hereinafter. The parameters received are for example a number i of a coefficient within the transformed residual which will be reconstructed differently and the corresponding reconstruction offset $\Theta_i$ as described elsewhere. The number of a coefficient is typically its position in as conventional ordering such as a zigzag scan.

These two parameters are in particular determined in advance and can be the same for the entire reconstruction (that is to say for all the blocks of pixels) of the corresponding reference image. In other words, these parameters are transmitted only once to the decoder for the image. However, it is possible to transmit these parameters (coefficient number and offset $\Theta_i$) block by block or by set of blocks, but the rate necessary for the transmission of this information then increases.

These two parameters produced by the module 520 are entropically encoded by the module 509, and then inserted in the binary stream (510)

In the module 519, the reverse quantization for calculating $W_i'$ is applied for the coefficient and reconstruction offset $\Theta_i$ defined in the parameters 520. For the other coefficients of the block, the reverse quantization is applied with the conventional reconstruction offset (used in the module 511). Thus the "second" reconstructions differ from the conventional reconstruction through the use of a single different pair (coefficient, offset).

In particular, if the encoder uses several types of transform or several transform sizes, a coefficient number and a reconstruction offset are transmitted to the decoder for each type or each size of transform.

At the end of the second reverse quantization 519, the same processing operations as those applied to the "conventional" signal are performed. In detail, a reverse transformation 512 is applied to this new residual (which has therefore been transformed 507, quantized 508 and then dequantized 519). Then, according to the coding of the current block (Intra or Inter), a reverse motion compensation 514 or a reverse Intra prediction 513 is performed.

Finally, when all the blocks (414, 415, 416) of the current image are decoded, this new reconstruction of the current image is filtered by the deblocking filter 515 before being inserted among the multiple "second" reconstructions 518.

In this way, there are obtained, in parallel, the image decoded via the module 511 constituting the conventional reference image, and one or more "second" reconstructions of the image (via the module 519 and other similar modules where applicable) constituting other reference images corresponding to the same image in the video sequence.

In FIG. 5, the processing according to the invention of the residuals transformed, quantized and dequantized by the second reverse quantization 519 is represented by the arrows in broken lines.

It will therefore be understood here that, like the illustration in FIG. 4, the coding of the following image can be carried out by blocks of pixels with motion compensation with reference to any block of one of the reference images thus reconstructed.

Figure 6:
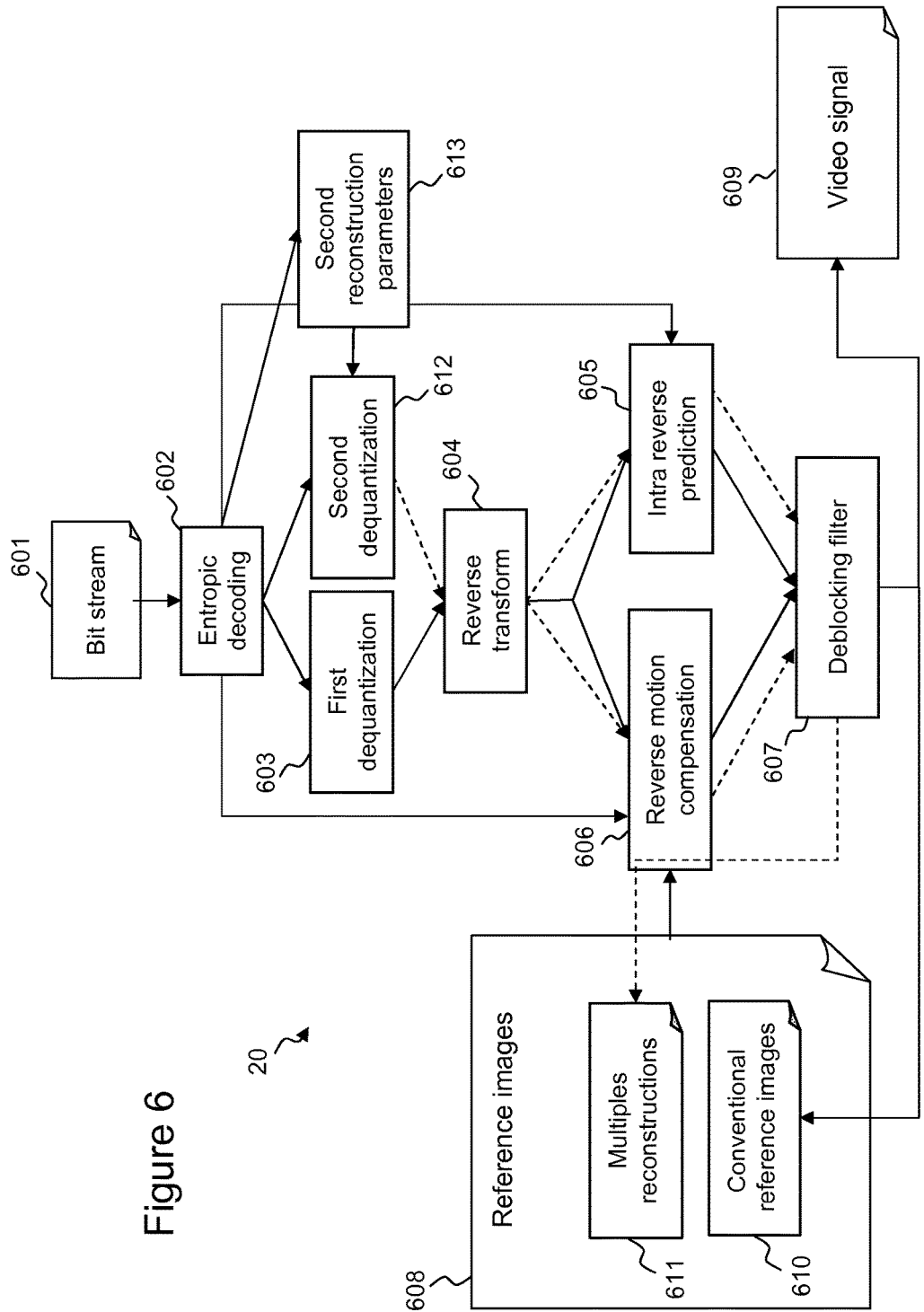
FIG. 6 shows the global diagram of a video decoder according to the first embodiment of the invention.

With reference now to FIG. 6, a decoder 20 according to the first embodiment comprises decoding processing modules 601 to 609 equivalent to the modules 201 to 209 described above in relation to FIG. 2, in order to produce a video signal 609 with a view to reproduction of the video sequence by display. In particular, the dequantization module 603 uses for example the formula $W_i'=(q_i \cdot |Z_i|-\theta_i) \cdot \text{sgn}(Z_i)$ disclosed previously.

By way of illustration and for reasons of simplification of representation, the images 451 to 457 (FIG. 4) can be considered to be the coded images constituting the bit stream 510 (the coding/entropic decoding not modifying the information in the image). The decoding of these images generates in particular the conventional reconstructed images making up the output video signal 609.

Figure 2:
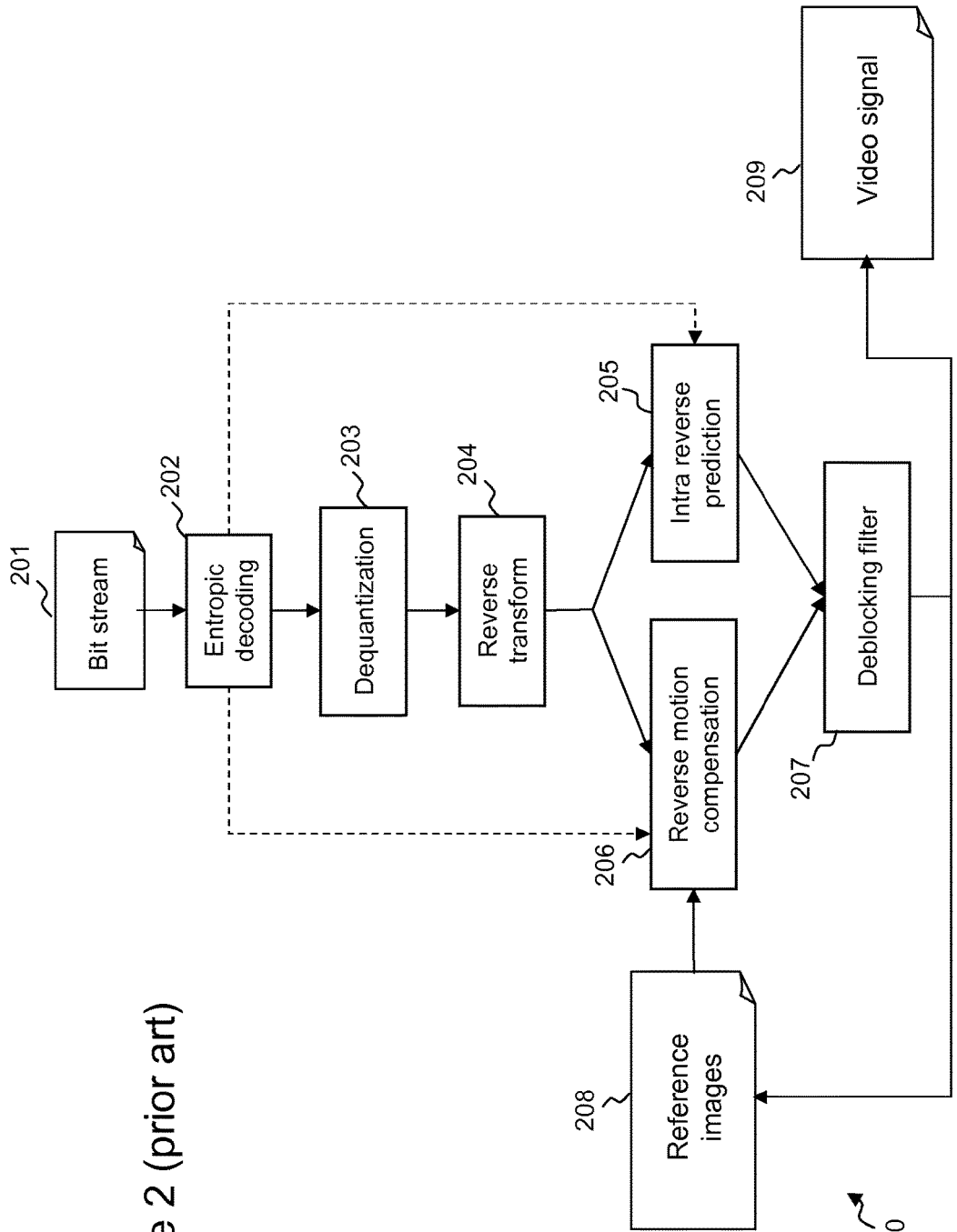
FIG. 2 shows the global diagram of a video decoder of the prior art.

The reference image module 608 is similar to the module 208 in FIG. 2 and, by analogy with FIG. 5, it is composed of a module of the multiple "second" reconstructions 611 and a module containing the conventional reference images 610.

At the start of the decoding of the current image, the number of multiple reconstructions is extracted from the bit stream 601 and decoded entropically. Likewise, the parameters (coefficient number and corresponding offset) of the "second" reconstructions are also extracted from the bit stream, decoded entropically and transmitted to the second reconstruction parameter module or modules 613.

In this example, we will describe the process of a single secondary construction, although, like the coder 10, other reconstructions can be performed, possibly in parallel, with suitable modules.

Thus a second dequantization module 612 calculates, for each data block, a reverse quantization different from the "conventional" module 603.

In this new reverse quantization, for the number of the coefficient given as a parameter 613, the dequantization equation is applied with the reconstruction offset $\Theta_i$ also supplied by the second reconstruction parameter module 613.

The other coefficients of each residual are, in this embodiment, dequantized with a reconstruction offset similar to the module 603, generally equal to zero.

As for the encoder, the residual (transformed, quantized, dequantized) at the output of the module 612 is detransformed (604) by application of the transform that is the reverse of the one 507 used on coding.

Then, according to the coding of the current block (Intra or Inter), a reverse motion compensation 606 or a reverse Intra prediction 605 is performed.

Finally, when all the blocks of the current image are decoded, the new reconstruction of the current image is filtered by the deblocking filter 607 before being inserted among the multiple "second" reconstructions 611.

This travel of the residuals transformed, quantized and dequantized by the second reverse quantization 612 is symbolized by the arrows in broken lines. It should be noted that these "second" reconstructions of the current image are not used as a video signal output 609. This is because these other reconstructions are used only as supplementary reference images for subsequent predictions, whereas only the image reconstructed conventionally constitutes the video output signal 609.

Because of this non-use of the "second" reconstruction as an output signal, in a variant embodiment aimed at reducing the calculations and the processing time, it is envisaged reconstructing, as a "second" reconstruction, only the blocks of the "second" reconstruction actually used for the motion compensation. "Actually used" means a block of the "second" reconstruction that constitutes a reference (that is to say a block predictor) for the motion compensation for a block of a subsequently encoded image in the video sequence.

Figure 7:
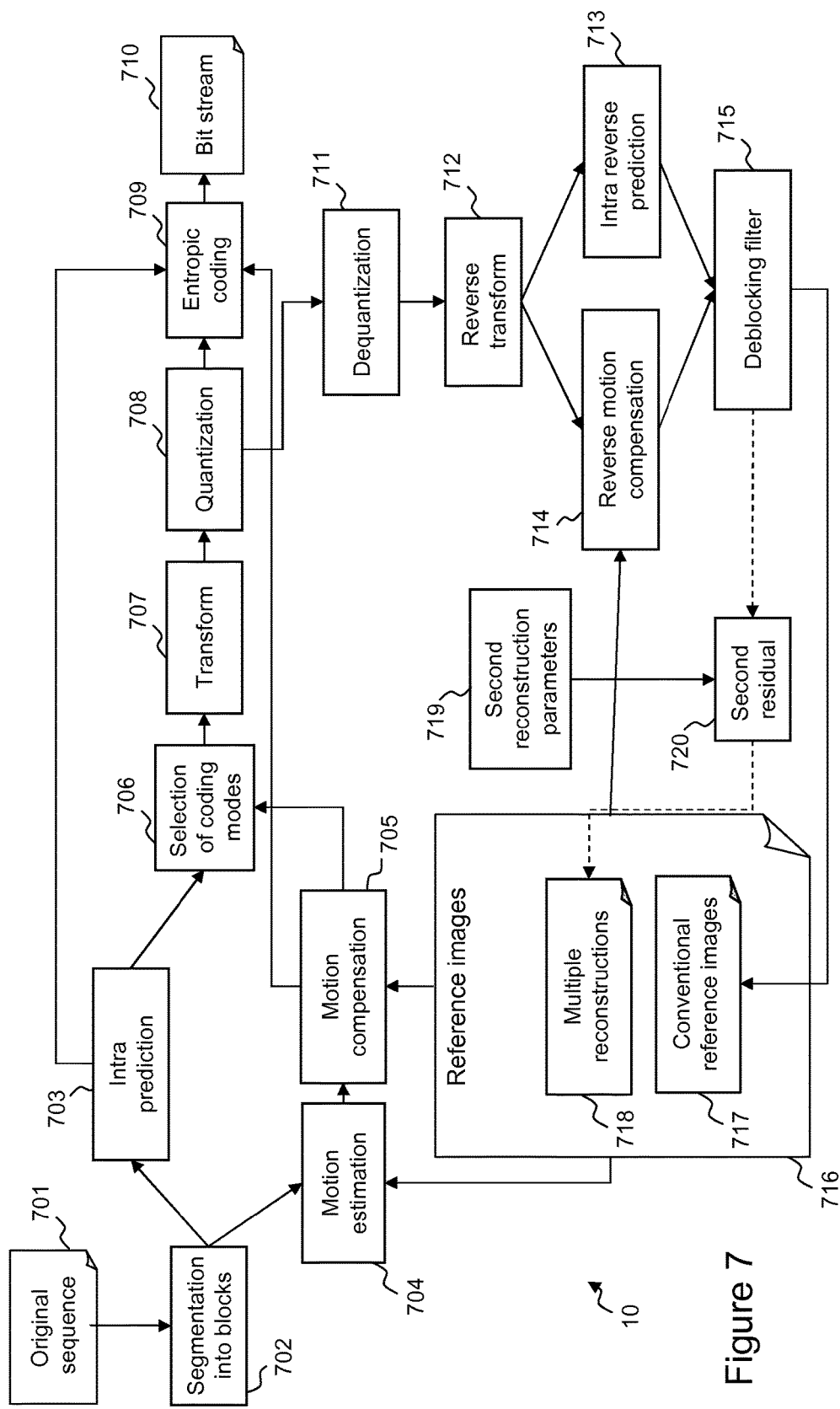
FIG. 7 shows the global diagram of a video encoder according to a second embodiment of the invention.
Figure 8:
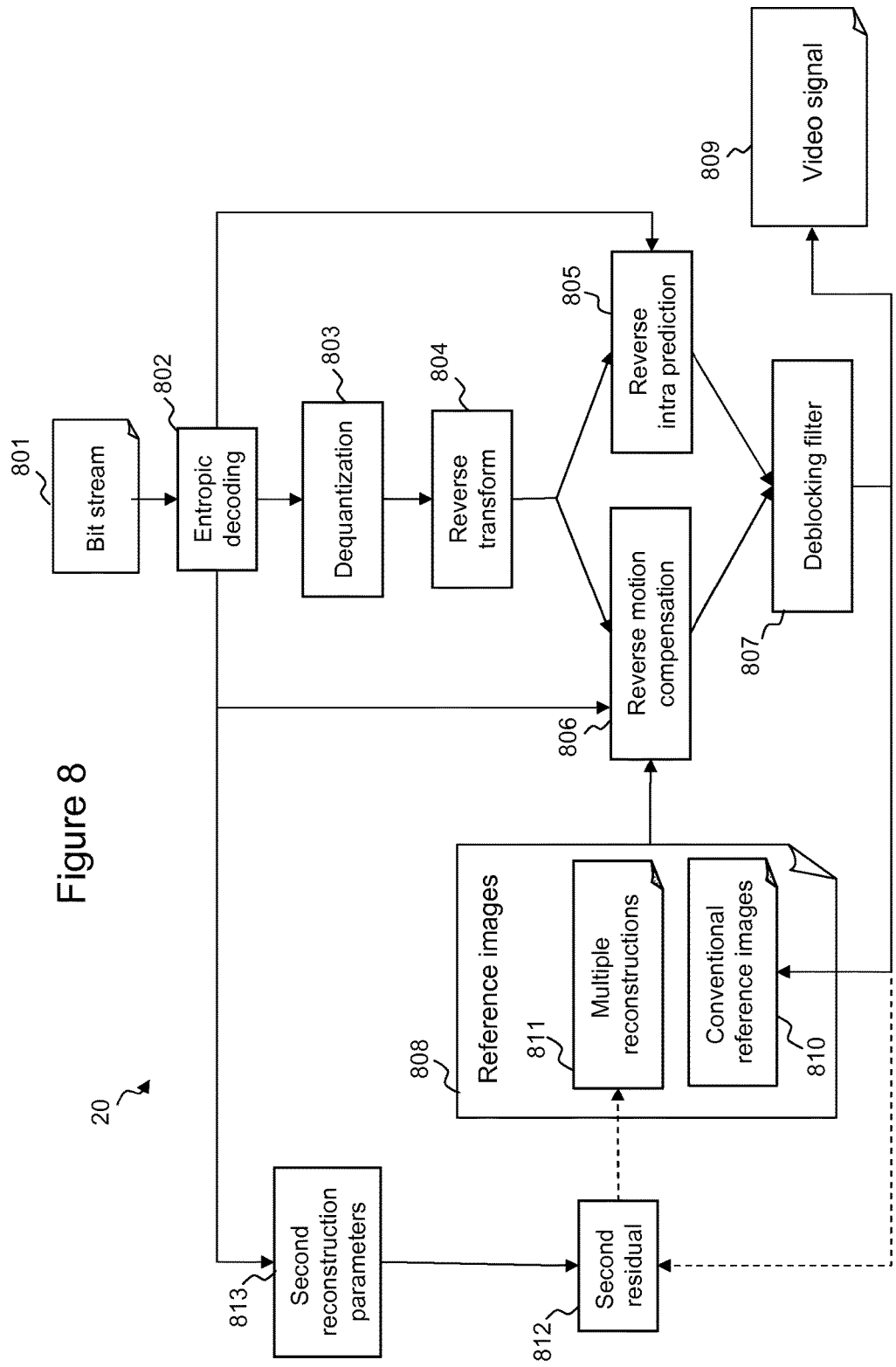
FIG. 8 shows the global diagram of a video decoder according to the second embodiment of the invention.

A description is now given of a simplified embodiment of the invention, with reference to FIGS. 7 and 8. In this second embodiment, the "second" reconstructions are no longer produced from the quantized residuals by applying, for each of the reconstructions, all the steps of reverse quantization 519, reverse transformation 512, Inter/Intra determination 513-514 and then deblocking 515. These "second" reconstructions are produced more simply from the "conventional" reconstruction producing the conventional reference image 517. Thus the other reconstructions of an image are constructed outside the decoding loop.

In the encoder 10 of FIG. 7, the modules 701 to 715 are similar to the modules 101 to 115 in FIG. 1 and to the modules 501 and 515 in FIG. 5. These are modules for a conventional processing according to the prior art.

The reference images 716 composed of the conventional reference images 717 and the "second" reconstructions 718 are respectively similar to the modules 516, 517, 518 of FIG. 5. In particular, the images 717 are the same as the images 517.

In this second embodiment, the multiple "second" reconstructions 718 of an image are calculated after the decoding loop, once the conventional reference image 717 corresponding to the current image has been calculated.

The "second reconstruction parameters" module 719, a functioning of which will be detailed hereinafter, supplies a coefficient number i and a reconstruction offset $\Theta_i$ to the module 720, called the corrective residual module.

Like for module 520, the two parameters produced by the module 719 are entropically coded by the module 709, and then inserted in the bitstream (710).

The latter 720 calculates a reverse quantization of a block, the coefficients of which are all equal to zero. During this dequantization, the coefficient having the position "i" supplied by the module 719 is dequantized by the equation $W_i'=(q_i\cdot|Z_i|-\theta_i)\cdot\text{sgn}(Z_i)$ by applying the reconstruction offset $\Theta_i$ supplied by this same module 719 and different from the offset (generally zero) used at 711. This reverse quantization results in a block of coefficients, in which the coefficient with the number i takes the value $\Theta_i$, and the other block coefficients for their part remain equal to zero.

The generated block then undergoes a reverse transformation, which provides a corrective residual block.

Then the corrective residual block is added to each of the blocks of the conventionally reconstructed current image 717 in order to supply a new reference image, which is inserted in the module 718.

It will therefore be remarked that the module 720 produces a corrective residual aimed at correcting the conventional reference image as "second" reference images as they should have been by application of the second reconstruction parameters used (at the module 719).

This method is less complex than the previous one firstly because it avoids performing the decoding loop (steps 711 to 715) for each of the "second" reconstructions and secondly since it suffices to calculate the corrective residual only once at the module 720.

In particular, it will be noted that this second embodiment is propitious to the absence of storage of the multiple "second" reconstructions 718, given that it is easy to calculate these on the fly (at the time of effecting the motion compensation) from the conventional reference image and the corrective residuals 720.

Note that the use of several types or sizes of transform or the use of adaptive quantization steps QP involves the calculation of second residuals adapted to these parameters. For example, in the standard H.264, when two sizes of transform are used (4×4 and 8×8), the calculation of two corrective residuals 720 should be necessary: a corrective residual of size 4×4 that is added to the coded blocks with the 4×4 transform and a corrective residual of size 8×8 that is added to the blocks coded with the transform 8×8.

Experimentally, it has been remarked that the application of a single corrective residual of size 4×4 to each of the 4×4 blocks of the 8×8 block is as effective as the use of these two corrective residuals even if the two transform sizes are used. Thus it is possible to make provision for applying a number of corrective residuals lower than the number of transform sizes. For example, only the residual with the smallest size is kept, here 4×4.

Finally, in a similar fashion to the first embodiment, other "second" reconstructions of the current image are obtained using the second residual module 720 several times with different secondary construction parameters 719.

It should be noted that the approaches in FIGS. 5 and 7 can be mixed to produce "second" reconstructions in a mixed fashion.

With reference now to FIG. 8, the decoder 20 corresponding to this embodiment comprises modules 801 to 809 equivalent to the modules 201 to 209 (and therefore 601 to 609). In addition, the module of the reference images 808 is similar to the module 608, with conventional reference images 810 (similar to 610) and multiple "second" reconstructions 811 (similar to 611).

As for the coding in FIG. 7, complete decoding is here performed only for the conventional reference image (which is used as a video output 209), the other reconstructions being produced by means of corrective residuals 812.

In detail, at the start of the decoding of the current image, the number of multiple reconstructions is extracted from the bit stream 801 and decoded entropically. Likewise, the parameters of the "second" reconstructions are also extracted from the bit stream, decoded entropically and transmitted to the second reconstruction parameters module 813.

These parameters are used to create a corrective texture residual 812. This residual is calculated in the same way as in the module 720: from a null block to which there are applied a reverse quantization, the quantization offset of which is modified for a particular coefficient number, and then a reverse transformation.

At the end of the decoding of the current image 807, this corrective residual 812 is added to each of the blocks of the current image before the latter is inserted among the many other reconstructions 811.

In a variant, this corrective residual can be applied only to the blocks actually used for a subsequent prediction.

As for the coding, the calculation of the corrective residual 812 can depend on the size or transformation type used or the quantization step QP used for coding each block.

The "second" decodings/reconstructions of the current image are obtained using the corrective residual module 812 several times with other second reconstruction parameters 813 extracted from the bit stream and decoded.

A description is now given of the functioning of the modules 520 and 719 for the selection of optimum coefficients and associated reconstruction offsets. The algorithms described below can in particular be used for a selection of parameters of other types of decodings/reconstructions of a current image as several "second" reconstructions: for example, reconstructions applying a contrast filter and/or a fuzzy filter on the conventional reference image. In this case, the selection can consist of choosing a value for a particular coefficient of a convolution filter used in these filters, or choosing the size of this filter.

It should be noted that the modules 613 and 813 provided on decoding merely recover information in the bit streams.

As introduced previously, in the embodiment described here, two parameters are used for performing a "second" reconstruction: the number i of the coefficient to be dequantized differently and the reconstruction offset $\Theta_i$ chosen to perform this different reverse quantization.

The modules 520 and 719 make an automatic selection of these parameters for a second reconstruction.

In detail, with regard to the quantization offset, it is first of all considered, to simplify the explanations, that the quantization offset $f_i$ of the equation $$Z_i = \text{int}\left(\frac{|W_i| + f_i}{q_i}\right) \cdot \text{sgn}(W_i)$$

above is routinely equal to $q_i/2$. Due to the nature of the quantization and reverse quantization processes, the optimal reconstruction offset $\Theta_i$ belongs to the interval $[-q_i/2; q_i/2]$.

As specified above, the "conventional" reconstruction for generating the signal 609/809 generally uses a zero offset ($\Theta_i=0$)

Several approaches for fixing the offset associated with a given coefficient (the selection of the coefficient is described thereafter), for a "second" reconstruction, can then be provided:
  according to a first approach: the choice of $\Theta_i$ is fixed according to the number of multiple "second" reconstructions of the current image already inserted in the list 518, 718 of the reference images. This configuration offers reduced complexity for this selection process. This is because it has been possible to observe that, for a given coefficient, the most effective reconstruction offset $\Theta_i$ is equal to $q_i/4$ or $-q_i/4$ when a single reconstruction of the first image belongs to all the reference images used. When two "second" reconstructions are already available (using Erreur! Liaison incorrecte. and Erreur! Liaison incorrecte.), an offset equal to $q_i/8$ or Erreur! Liaison incorrecte. Erreur! Liaison incorrecte. gives the best mean results in terms of rate/distortion of the signal for the following two "second" reconstructions, etc;
  according to a second approach: the offset $\Theta_i$ can be selected according to a rate/distortion criterion. If it is wished to add a new "second" reconstruction of the first reference image to all the reference images, then all the values (for example integers) of $\Theta_i$ belonging to the interval $[-q_i/2; q_i/2]$ are tested; that is to say each reconstruction (with $\Theta_i$ different for the given coefficient) is tested within the coding loop. The quantization offset that is selected for the coding is the one that minimizes the rate/distortion criterion;
  according to a third approach: the offset $\Theta_i$ that supplies the reconstruction that is most "complementary" to the "conventional" reconstruction (or to all the reconstructions already selected) is selected. For this purpose, the number of times is counted where a block of the evaluated reconstruction (associated with an offset $\Theta_i$, which varies over the range of possible values because of the quantization step QP) supplies a quality superior to the "conventional" reconstruction block (or all the reconstructions already selected), the quality being able to be assessed with a distortion measurement such as an SAD (absolute error–"Sum of Absolute Differences"), SSD (quadratic error–"Sum of Squared Differences") or PSNR ("Peak Signal to Noise Ratio"). The offset $\Theta_i$ that maximizes this number is selected.

According to the same approach, it is possible to construct the image each block of which is equal to the block that maximizes the quality from the block with the same position in the reconstruction to be evaluated, that of the "conventional" reconstruction and other second reconstructions already selected. Each complementary image, corresponding to each offset $\Theta_i$ (for the given coefficient), is evaluated with respect to the original image according to a quality criterion similar to those above. The offset $\Theta_i$ the image of which constructed in this way maximizes the quality, is then selected.

With regard to the choice of the coefficient to be modified, it is considered first of all that only the 4×4 DCT transform is used. The choice therefore consists of selecting the optimal coefficient from the 16 of the 4×4 DCT transform.

Several approaches are then envisaged, the best offset $\Theta_i$ being already known for each of the coefficients as determined above:
  first of all, the coefficient used for the second reconstruction is predetermined. This embodiment offers low complexity. In particular, the first coefficient (the coefficient denoted "DC" according to the prior art) is chosen. It has in fact been observed that the choice of this coefficient DC makes it possible to obtain "second" reconstructions that have the best mean results (in terms of rate/distortion);
  then, the reconstruction offset $\Theta_i$ being fixed, a similar procedure to the above second approach is followed to determine $\Theta_i$: the best offset is applied for each of the coefficients of the block and the coefficient that minimizes the rate/distortion criterion is selected;
  also, the coefficient number can be selected in a similar fashion to the third approach above in order to determine $\Theta_i$: the best offset is applied for each of the coefficients of the block and the coefficient that maximizes the quality is selected (the largest number of blocks evaluated having a better quality than the "conventional" block);
  also, it may be constructed the image, each block of which is equal to the block that maximizes the quality amongst the block with the same position in the reconstruction to be evaluated, the same block in the "conventional" reconstruction and in the other second reconstructions already selected.

These few examples of approaches enable the modules 520 and 719 to have available pairs (coefficient number; reconstruction offset) for driving the modules 519 and 720 and implementing the same number of "second" reconstructions.

A description is now given of a process used, still by these modules 520 and 719, for the automatic selection of the best type of reference image.

This is because the multiple "second" reconstructions do not routinely provide positive gains in terms of performance (reduction in rate, improved rate/distortion ratio, etc) as well as the "conventional" reconstruction. There are therefore proposed here criteria to be used for selecting a set of reference images belonging to the conventional reference images (517 and 717) and to the "second" reconstructions of these images (518 and 718). In order to guarantee a rate/distortion/complexity compromise, the maximum number of reference images recommended by the VCEG group is four.

At this stage, the coefficient number and the offset associated with each processed reconstruction, and four conventional reference images, are already known. Here also, several approaches can be adopted:

- as for the first criteria for the selection of the coefficient or of the reconstruction offset, the reference images can be predefined, namely for example keeping the three most recent reference images and replacing the oldest of the four with a "second" reconstruction of the most recent image. In particular, it has been observed that the replacement of a reference image (the oldest) is more effective on average than the replacement of the three oldest reference images, by "second" reconstructions of the closest image;
- as for the second criteria for the selection of the coefficient or the reconstruction offset, it is possible to encode a following image in the video sequence with each of the sets of possible reference images (several subsets of images), and to evaluate which of these sets of reference images obtains the best rate/distortion compromise for coding the following image. The corresponding replacements are then made;
- as for the third criteria for the selection of the coefficient or reconstruction offset, for a new reconstruction and a reference image already stored (possibly the conventional reference image), an image is created where each block is the block of best quality between the two reconstructions. The PSNR of this image is then calculated. If the difference between this PSNR and that of the reference image to be replaced (the one already stored) is greater than δ then the new reconstruction replaces this reference image. δ is defined by the following formula:

$$\delta = \frac{QP}{\lambda_1 FrameRate + \lambda_2 ImageSize},$$

where QP is the quantization step used for coding, FrameRate is the number of images per second, ImageSize is the number of pixels in the current image, and $\lambda_1$ and $\lambda_2$ are weighting coefficients that depend on the coding choices used. If several reference images are already stored, the one corresponding to the highest PSNR (greater than δ) is replaced.

Figure 9:
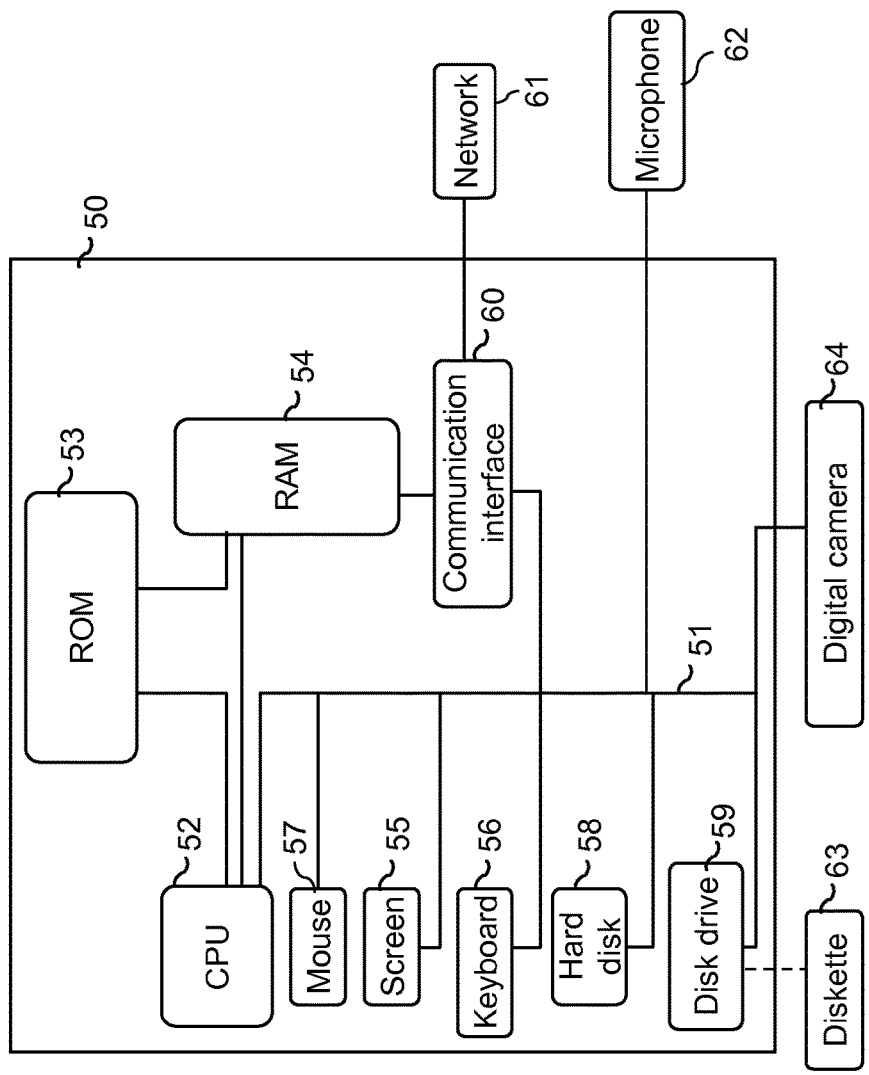
FIG. 9 shows a particular hardware configuration of a device suitable for implementation of the method or methods according to the invention.

With reference now to FIG. 9, a description is given by way of example of a particular hardware configuration of a video sequence processing device suitable for implementing the method according to the invention.

An information processing device implementing the invention is for example a microcomputer 50, a workstation, a personal assistant, or a mobile telephone connected to various peripherals. According to yet another embodiment of the invention, the information processing device is in the form of a photographic apparatus provided with a communication interface for enabling connection to a network.

The peripherals connected to the information processing device comprise for example a digital camera 64, or a scanner or any other image acquisition or storage means, connected to an input/output card (not shown) and supplying information on the multimedia data to the processing device, for example of the video sequence type.

The device 50 comprises a communication bus 51 to which there are connected:

- a central processing unit CPU 52 in the form for example of a microprocessor;
- a read only memory 53 in which the programs the execution of which enables the method according to the invention to be implemented can be contained. This may be a flash memory or EEPROM;
- a random access memory 54 which, after the device 50 is powered up, contains the executable code of the programs of the invention necessary for implementing the invention. This random access memory 54 is of the RAM type (with random access), which offers rapid accesses compared with the read only memory 53. This RAM memory 54 stores in particular the various images and the various blocks of pixels as the processing is carried out (transformation, quantization, storage of reference images) on the video sequences;
- a screen 55 for displaying data, in particular video data, and/or serving as a graphical interface with the user, who can thus interact with the programs of the invention, by means of a keyboard 56 or any other means such as a pointing device, such as for example a mouse 57 or an optical pen;
- a hard disk 58 or a storage memory, such as a memory of the compact flash type, able to contain the programs of the invention as well as data used or produced during the implementation of the invention;
- an optional diskette drive 59, or another drive for a removable data carrier, adapted to receive a diskette 63 and to read/write thereon data processed or to be processed in accordance with the invention; and
- a communication interface 60 connected to the telecommunication network 61, the interface 60 being able to transmit and receive data.

In the case of audio data, the device 50 is preferably equipped with an input/output card (not shown), which is connected to a microphone 62.

The communication bus 51 enables communication and interoperability between the various elements included in the device 50 or connected thereto. The representation of the bus 51 is not limitative and in particular the central unit 52 is able to communicate instructions to any element of the device 50 directly or by means of another element of the device 50.

The diskettes 63 can be replaced by any information carrier such as for example a compact disk (CD-ROM), rewritable or not, a zip disk or a memory card. In general terms, an information storage means, able to be read by a microcomputer or by a microprocessor, integrated or not in the video sequence processing device (coding or decoding), possibly removable, is adapted to store one or more programs the execution of which enables the method according to the invention to be implemented.

The executable code enabling the video sequence processing device to implement the invention can be either stored in read only memory 53, on the hard disk 58 or on a removable digital medium such as for example a diskette 63 as described previously. According to a variant, the executable code of the programs is received by means of the telecommunication network 61, via the interface 60, in order to be stored in one of the storage means of the device 50 (such as the hard disk 58 for example) before being executed.

The central unit 52 controls and directs the execution of the instructions or portions of software code of the program or programs of the invention, the instructions or portions of software code being stored in one of the aforementioned storage means. When the device 50 is powered up, the program or programs stored in a non-volatile memory, for example the hard disk 58 or the read only memory 53, are transferred into the random access memory 54, which then contains the executable code of the program or programs of the invention, as well as registers for storing the variables and parameters necessary for implementing the invention.

It should also be noted that the device implementing the invention or incorporating it can also be produced in the form of a programmed apparatus. For example, such a device can then contain the code of the computer program or programs in a fixed form in an application specific integrated circuit (ASIC).

The device described here and in particular the central unit 52 are able to implement all or some of the processing operations described in relation to FIGS. 4 to 8, in order to implement the methods that are the subject matter of the present invention and constitute the devices that are the subject matter of the present invention.

The above examples are merely embodiments of the invention, which is not limited thereby.

In particular the embodiments described above provide for the generation of "second" reference images for which only one pair (coefficient number; quantization offset) is different with respect to the "conventional" reference image. Provision can however be made for a larger number of parameters to be modified in order to generate a "second" reconstruction: for example several pairs (coefficient; offset)

The invention claimed is:

1. A method of processing a video sequence in which the video sequence comprises a series of digital images including a) a current image and b) a first image prior to the current image, the method comprising:
   1) generating a first reconstruction of the first image and a second reconstruction of the first image, the second reconstruction being different from the first reconstruction,
   wherein the first reconstruction is generated so as to obtain a first reference image, and
   wherein the second reconstruction is generated so as to obtain a second reference image;
   2) selecting at least one reference image from the first reference image and the second reference image; and
   3) predicting at least part of the current image from the selected at least one reference image,
   wherein the images are defined by a plurality of data blocks, and wherein the second reconstruction of the first image comprises a reconstruction solely of blocks of the first image that are used during a prediction of at least part of the current image.

2. The method according claim 1, wherein the first and second reconstructions are produced from a quantized version of the first image, and wherein the first and second reconstructions differ through different reverse quantizations.

3. The method according to claim 2, wherein the quantized version of the first image includes plural data blocks each formed by a set of coefficients, and the different reverse quantizations use, for the same data block coefficient (Wi) of the image, different quantization offsets ($\theta$i).

4. The method according to claim 3, further comprising automatically selecting at least one block coefficient (Wi) and its associated quantization offset ($\theta$i) in order to generate the second reconstruction different from the first reconstruction.

5. The method according to any one of claim 3 or 4, wherein generating the second reconstruction comprises:
   determining at least one corrective residual from at least one second reconstruction parameter and a block of coefficients all equal to zero; and
   adding the at least one corrective residual to the first reference image so as to obtain the second reference image.

6. The method according to claim 5, wherein determining a corrective residual comprises a reverse quantization of the block of coefficients all equal to zero, the reverse quantization using, for at least one block coefficient, a quantization offset different from that used for the first reconstruction.

7. The method according to claim 5, wherein the processing of the video sequence further comprises a transformation of image blocks using several block sizes, and wherein generating the second reconstruction uses corrective residuals of only one size.

8. The method according to any one of claims 1 to 4, wherein the first and second reconstructions of the first image are generated in parallel from the first image.

9. The method according to any one of claims 1 to 4, wherein in the predicting step, the first and second reference images comprise reconstructions of a single first image in the sequence.

10. The method according to claim 9, wherein the single first image is the closest one in time to the current image within the video sequence.

11. The method according to any one of claims 1 to 4, further comprising replacing the first reference image previously stored in memory with the second reference image.

12. The method according to claim 11, wherein the previously stored first reference image is comprised of a reconstructed image according to a reconstruction provided in a standard coding format.

13. The method according to any one of claims 1 to 4, further comprising coding of the video sequence as a coded stream, and signaling, in the coded stream resulting from the coding, information representing parameters of the reconstructions selected for the reference images.

14. The method according to any one of claims 1 to 4, wherein predicting comprises predicting part of the current image from the first reference image corresponding to a first image in the sequence, and predicting at least one other part of the current image from a second reference image corresponding to the same first image in the sequence.

15. A non-transitory computer-readable memory storage medium which stores computer-executable program instructions readable by a processor and configured to implement the processing method according to any one of claims 1 to 4, when the computer-executable program instructions are read from the computer-readable memory storage medium and loaded into and executed by the processor.

16. The method according to claim 1, wherein the first reference image and the second reference image are stored together in a memory.

* * * * *